Sept. 21, 1937.                L. E. VAUGHN                2,093,788
                                PIPE TONGS
                           Filed May 18, 1936            4 Sheets-Sheet 1
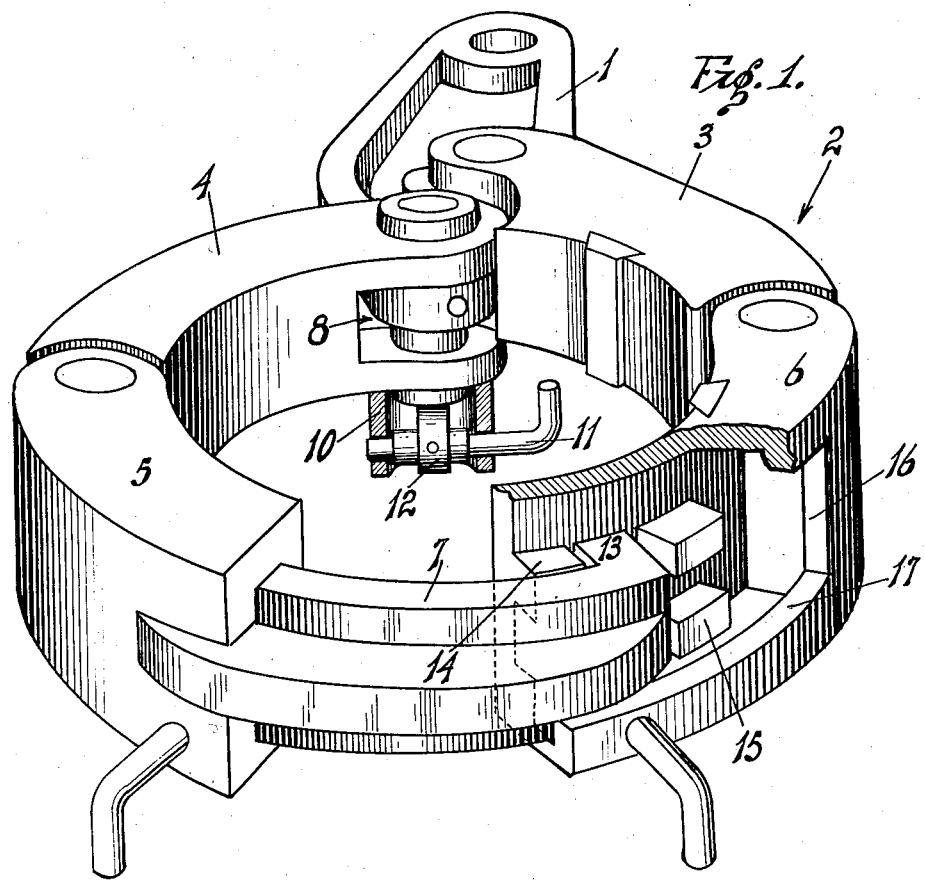
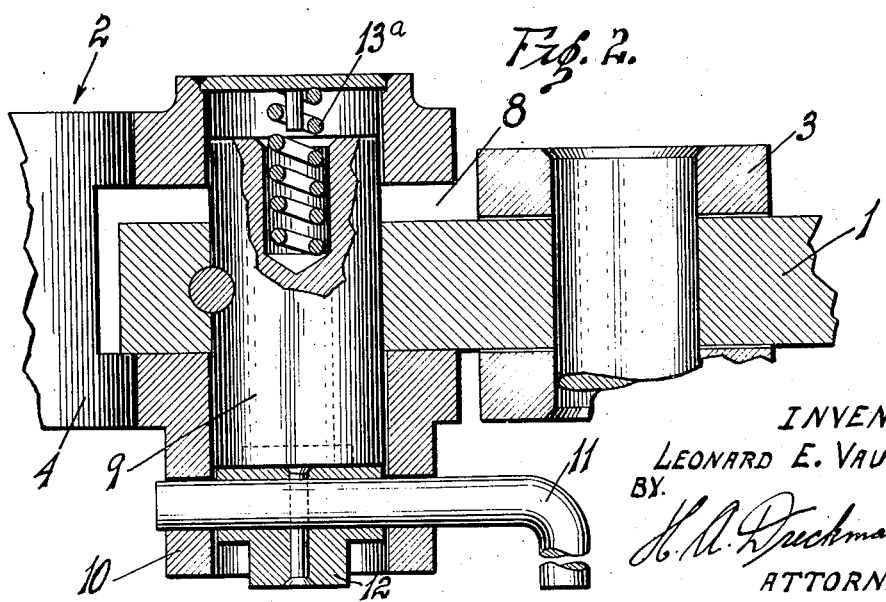
INVENTOR.
LEONARD E. VAUGHN.
BY
                ATTORNEY.

Sept. 21, 1937.     L. E. VAUGHN     2,093,788
PIPE TONGS
Filed May 18, 1936     4 Sheets—Sheet 2
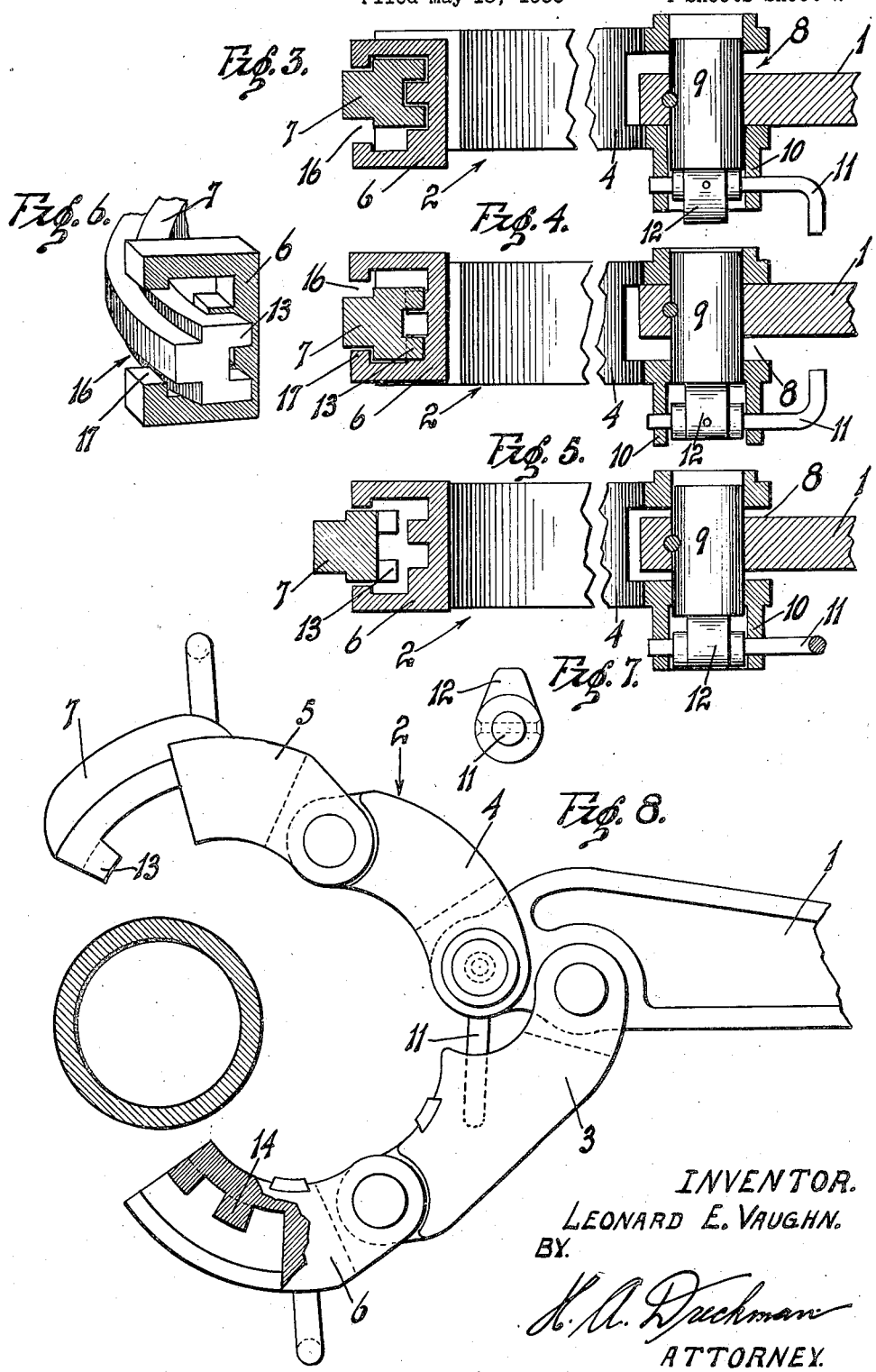
INVENTOR.
LEONARD E. VAUGHN.
BY
ATTORNEY.

Sept. 21, 1937.  L. E. VAUGHN  2,093,788
PIPE TONGS
Filed May 18, 1936  4 Sheets-Sheet 3

INVENTOR.
LEONARD E. VAUGHN.
BY
*H. A. Duckman*
ATTORNEY.

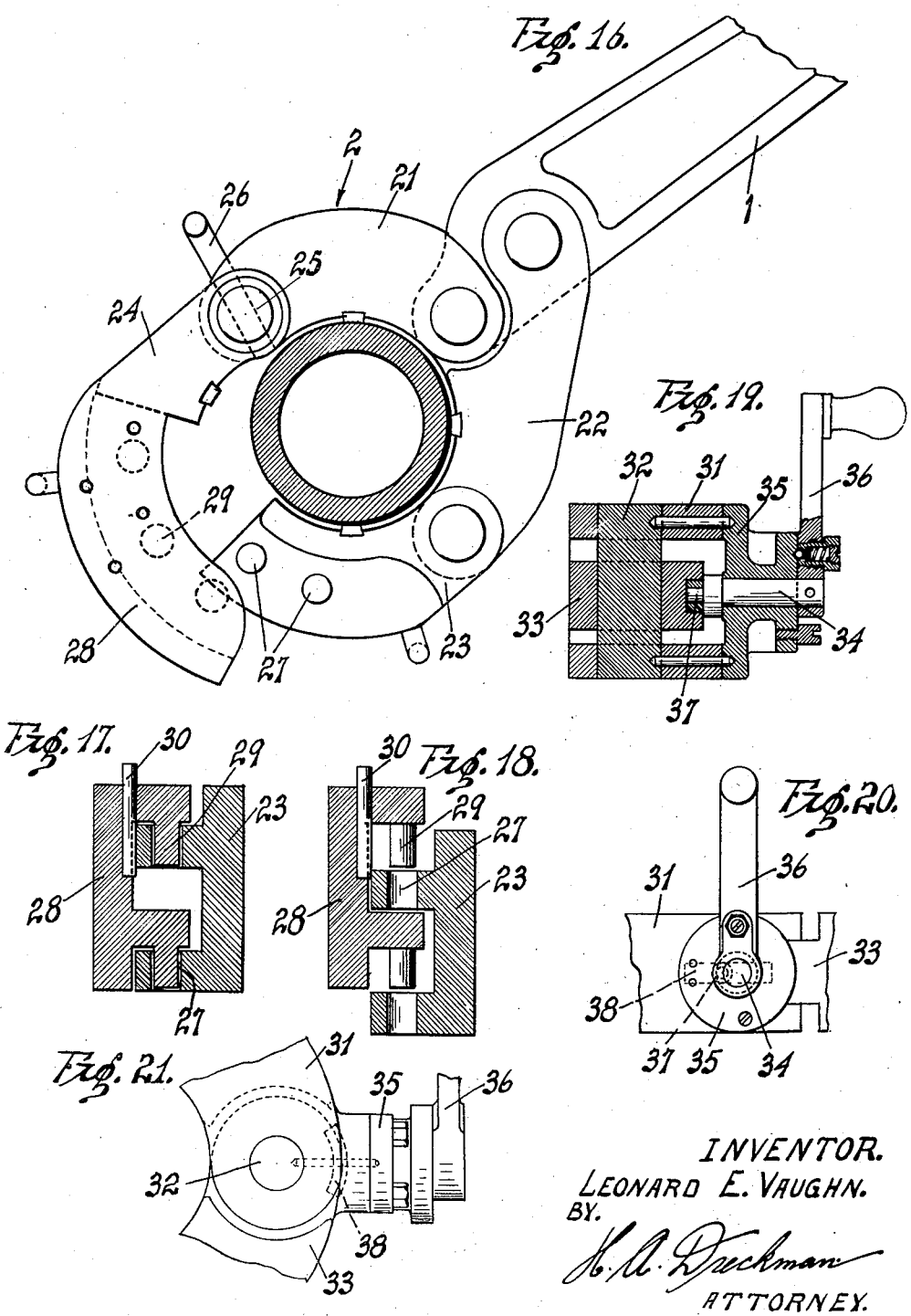

Patented Sept. 21, 1937

2,093,788

UNITED STATES PATENT OFFICE 2,093,788

PIPE TONGS

Leonard E. Vaughn, Huntington Park, Calif.

Application May 18, 1936, Serial No. 80,358

12 Claims. (Cl. 81—66)

REISSUED
FEB 13 1940

This invention relates to tongs of the type, such as pipe or casing tongs which are used in handling well casing, tubing, and the like, and particularly in oil wells.

An object of my invention is to provide a device of this general character which is strong and effective, and which can be quickly and easily latched and unlatched about the casing or pipe, and one which will not easily break and thus endanger the life of the operator. Tongs heretofore in use have been cumbersome to operate and the parts thereof have frequently broken, and the latching mechanism used to secure the jaws about the pipe or casing frequently unlatched, all of which seriously endangered the life of the operator. In my invention, the pipe-engaging jaws are positively locked about the pipe or casing by a relative vertical movement of one or more jaws, this vertical movement being manually accomplished, and when the jaws are in locked position, a movement of the manually operated mechanism is necessary before the jaws are released for withdrawal from the pipe or casing.

A further object of my invention is to provide tongs of the general character stated in which the latch heretofore in use is eliminated.

A feature of my invention is the provision of a device of the character specified, which can be easily and conveniently locked and unlocked and to lock the device it is merely necessary to manually move a lever. This same lever also acts to release the tongs. This arrangement increases the speed with which the tongs can be operated.

Other objects, advantages and features of invention may appear from the accompanying drawings, the subjoined detailed description, and the appended claims.

In the drawings

Figure 1 is a perspective view of my tongs with parts broken away to show interior construction.

Figure 2 is a fragmentary transverse sectional view of the mounting pin and mechanism whereby a jaw is moved vertically relative to the other jaws.

Figure 3 is a fragmentary transverse sectional view of the vertically movable jaw and actuating means therefor, with the jaw in engaging position.

Figure 4 is a view similar to Fig. 3, with jaw in engaged position.

Figure 5 is a view similar to Fig. 3, with the jaw in disengaging position.

Figure 6 is a fragmentary perspective view, diagrammatic in nature, showing the locking finger in engaged position in the keeper jaw.

Figure 7 is a side elevation of the operating cam.

Figure 8 is a plan view of the tongs in position to encircle the pipe, with parts broken away to show interior construction.

Figure 16 is a plan view of the tongs with another type of keeper jaw and locking finger.

Figure 17 is a transverse sectional view of the keeper jaw and locking finger shown in Fig. 16, with parts in engaged position.

Figure 18 is a view similar to Fig. 17, with parts shown in engaging position.

Figure 19 is a transverse sectional view of one of the jaws of the tongs, illustrating a modified form of moving means for the jaw.

Figure 20 is a fragmentary side elevation of the actuating means shown in Fig. 19.

Figure 21 is a fragmentary plan view of the actuating means shown in Fig. 19.

Figure 9:
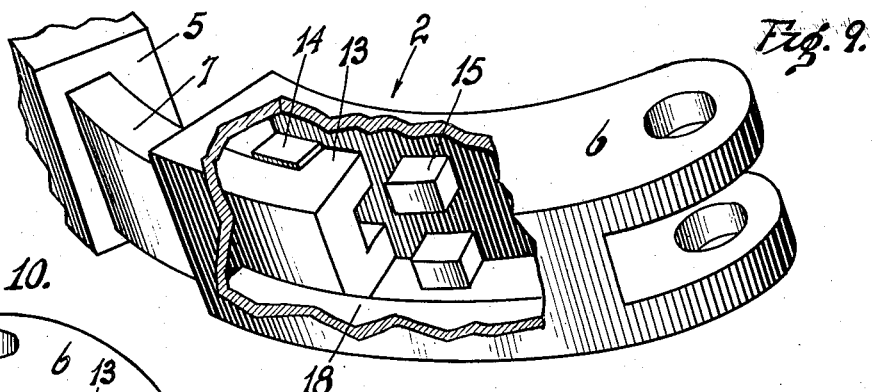
Figure 9 is a fragmentary perspective view of a modified form of keeper jaw, the locking finger being shown in engaged position.

Referring more particularly to the drawings. In my tongs, one jaw or set of jaws are mounted on the handle and are movable in a horizontal plane, as well as being vertically movable relative to the other jaws, thereby moving one jaw or set of jaws into and out of locking position with the other jaw or set of jaws.

The numeral 1 indicates the handle at the inner end of which is mounted the pipe or the casing-engaging mechanism 2. The handle 1 is of the usual elongated type, such as is generally used in devices of this character. While I have here illustrated the casing-engaging mechanism as consisting of a plurality of pivotally mounted jaws, it is obvious that the number of these jaws can be varied so long as the jaws can be moved horizontally to engage and disengage the pipe or casing.

Considering Figs. 1 to 15, inclusive. The casing engaging means comprises two oppositely disposed inner jaws 3 and 4, a locking jaw 5 and a keeper jaw 6. The locking jaw is provided with a locking finger 7. The inner jaws are pivotally attached to the handle 1 and the locking jaw 5 and keeper jaw 6 are either pivotally or fixedly attached to the jaws 4 and 3, respectively. The locking finger 7 is caused to engage and disengage the keeper jaw, as will be further described.

The engagement and disengagement of the locking finger is accomplished by the vertical movement of the jaws 4 and 5 by means of the following arrangement: The inner end of the jaw 4 is bifurcated, as shown at 8; the inner end of the handle 1 fits into the bifurcation 8 and this bifurcation is greater than the thickness of the handle, thereby permitting vertical movement of the jaw 4. A pin 9 is fixedly mounted in the handle 1 and this pin extends thru the jaw 4 at its bifurcated end whereby the jaw is guided in its vertical movement, as will be further described.

An apron 10 depends from the jaw 4 at its bifurcated end, and the handle 11 is journaled in the apron. A cam 12 is fixedly attached to the handle 11 and on rotation of this handle the cam will bear against the bottom of the pin 9.

A coil spring 13a bears against the upper wing of the bifurcation, thereby urging the jaw 4 into raised position, as shown in Fig. 2. When the handle 11 is rotated to move the cam 12 into engagement with the bottom of the pin 9, the jaws 4, 5 will be moved downwardly, thereby carrying the locking finger 7 into locked position, as shown in Figs. 1 and 4. When it is desired to release the tongs, the handle 11 is again rotated so that the dwell of the cam moves away from the pin whereupon the jaws 4, 5 are moved upwardly, and the locking finger 7 disengages the keeper jaw.

Figure 14:
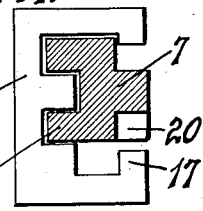
Figure 14 is a view similar to Fig. 13 but with the locking finger about to engage the jaw.
Figure 15:
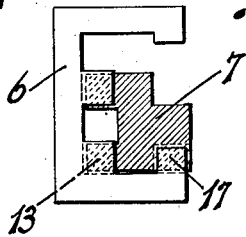
Figure 15 is a view similar to Fig. 13 but with the locking finger in engaged position.

The inter-connecting engagement of the locking finger and the keeper jaw may be effected in the following manner: The locking finger 7 is provided with one or more inwardly extending lugs 13 and these lugs are moved into or out of engagement with keeper lugs 14 which project from the inner wall of the keeper jaw 6. The lugs 13 are preferably spaced vertically, as are also the keeper lugs 14. Thus, in the raised position of the locking finger 7, the lugs 13 will pass over the keeper lugs 14, as shown in Figs. 3, 10 and 14, and after the pipe has been encircled by the jaws, a downward movement of the jaws 4, 5 will then move the lugs 13 back of the keeper lugs 14, as shown in Figs. 1, 4, 6, 9, 11 and 15.

To accommodate different sized pipes, I may provide spaced sets of keeper lugs on the jaw 6, such as are shown at 15.

As shown in Figs. 1 to 8, inclusive, the locking finger 7 can swing into the keeper jaw 6 thru a horizontal slot 16. A rib 17 adjacent the bottom of the jaw 6 is so spaced from the inner wall of the jaw that the locking finger 7 will engage this rib when in lowered and locked position, thus holding the locking finger against accidental outward movement while the tongs are being used.

Figure 10:
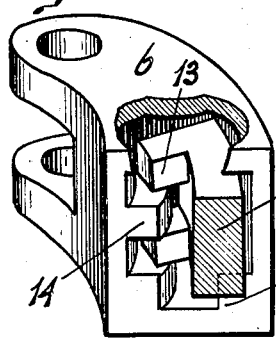
Figure 10 is a fragmentary perspective view of the keeper jaw shown in Fig. 9, and with the locking finger about to engage the jaw.
Figure 11:
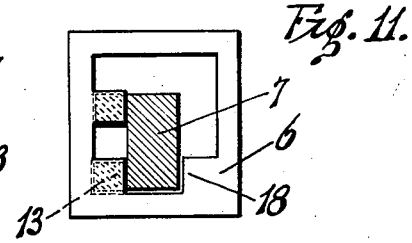
Figure 11 is an end view of the keeper jaw shown in Fig. 9, with the locking finger in engaged position.
Figure 12:
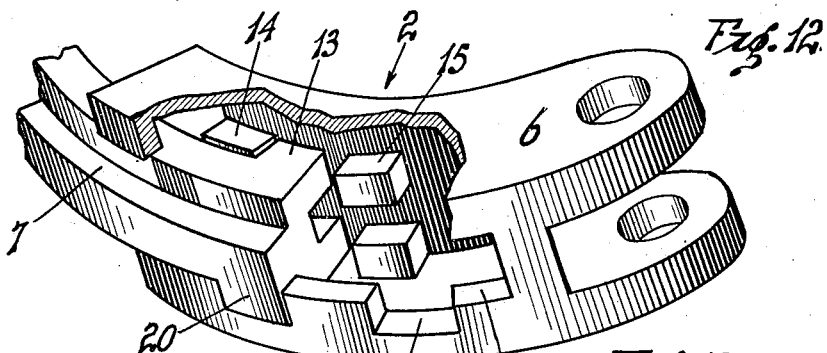
Figure 12 is a fragmentary perspective view of still another type of keeper jaw and locking finger.
Figure 13:
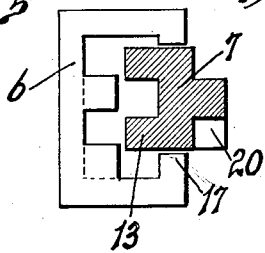
Figure 13 is an end view of the keeper jaw shown in Fig. 12, with the locking finger entering the jaw.

In Figs. 9 to 11, inclusive, the slot 16 is eliminated and the jaw 6 is cored out. In this arrangement, the locking finger enters the jaw from the end and then moves vertically into locked position, the same as previously described. The rib 18 in the bottom of the jaw is engaged by the locking finger to keep this finger from disengaging the keeper lugs 14.

In Figs. 12 to 15, inclusive, I have shown still another type of keeper jaw and locking finger. The rib 17 is provided with a plurality of notches 19 which notches are adapted to receive a depending lug 20 on the locking finger. With this arrangement, I provide a type of T-head lock in which inter-engaging lugs are provided on both the inner and outer set of locking fingers.

From the foregoing description, it will be evident that both of the jaws 4, 5 are moved vertically in order to latch and unlatch the tongs.

In Figs. 16 to 18, inclusive, I provide an inner pair of oppositely arranged jaws 21, 22. Each of these jaws is pivotally attached to the inner end of the handle 1. A keeper jaw or tip 23 is pivotally or fixedly attached to the outer end of the jaw 22. A latching jaw 24 is pivotally attached to the outer end of the jaw 21. In this modification, a structure substantially identical to that shown in Fig. 2 is provided at the pivot 25 between the jaws 21, 24. That is, the inner end of the jaw 24 is bifurcated and slides on the pin 25. The pin 25 is identical to 9. The same handle arrangement 26 is provided substantially identical to the handle 11. The cam operating means, as previously described, is here employed whereby only the jaw 24 is moved vertically in order to latch and unlatch the tongs.

The outer end of the jaw 23 is provided with a plurality of spaced holes 27. A locking finger 28 is provided with downwardly extending pins 29 which fit into the holes 27. Thus, in order to latch the tongs, the finger 28 is swung inwardly until the pins 29 are aligned with the holes 27. Then, by rotating the handle 26, the jaw 24 is lowered and the pins 29 enter the holes 27, as shown in Fig. 17.

For the purpose of aligning the pins 29 and the holes 27, I may use removable dowel pins 30 in the finger 28. These dowels engage the edge of the keeper jaw 23 when the pins 29 are in a position to be lowered into the holes 27.

Another means of moving the locking jaw vertically relative to the other jaws in the tongs is illustrated in Figs. 19 to 21, inclusive. The inner jaw 31 is bifurcated and the pin 32 is fixedly mounted therein. The locking jaw 33 is slidably mounted on the pin 32. A shaft 34 is journaled in a plate 35 which plate is fixedly attached to the jaw 31. A handle 36 is secured to the shaft 34 for the purpose of rotating this shaft. A cam 37 on the inner end of the shaft 34 fits into an elongated cam groove 38. The cam groove is formed in the jaw 33. Thus, by rotating the shaft 34, the jaw 33 will be raised or lowered for the purpose of moving a locking finger into a disengaged position.

Having described my invention, I claim:

1. Pipe tongs comprising a handle, a casing-engaging means connected to the handle, said means comprising oppositely disposed pipe-engaging jaws, said jaws being pivotally attached at one end to the handle, one of said jaws being vertically movable, means detachably connecting the outer swinging ends of the jaws, said last named means including a manually operable means engaging one of the jaws whereby said last named jaw is moved vertically with respect to its inter-engaging jaw.

2. Pipe tongs comprising a handle, a casing-engaging means connected to the handle, said means comprising oppositely disposed series of pivotally connected pipe-engaging jaws, a pair of said jaws being pivotally mounted on the handle, means detachably connecting the outer swinging ends of the jaws, said means including engageable means on one of the jaws, engaging means on the inter-engaging jaw, and means engaging a jaw in one of the oppositely disposed symmetrical series whereby one of the engaging jaws may be moved vertically relative to the inter-engaging jaw to engage and disengage said engaging means.

3. Pipe tongs comprising a handle, casing-engaging means connected to the handle comprising two oppositely disposed series of pivotally connected jaws, means for detachably connecting the outer swinging jaws of the two series, said last named means comprising engageable means on one of the jaws and engaging means on the other of the jaws, and manually operable means engaging a jaw of one series whereby said jaw may be vertically moved relative to the inter-engaging jaw, thereby engaging and disengaging the detachable connecting means.

4. Pipe tongs comprising a handle, two oppositely disposed series of pivotally connected jaws mounted on the handle, the outer swinging pair of the series of jaws being detachably connected, engageable means on one of the outer jaws, engaging means on the other of the outer jaws, and manually operable means engaging one of the series of connected jaws whereby said jaws may be vertically moved relative to the inter-engaging jaw to engage and disengage the outer jaws.

5. Pipe tongs comprising a handle, two oppositely disposed series of pivotally connected jaws mounted on the handle, the outer swinging pair of the series of jaws being detachably connected, engageable means on one of the outer jaws, engaging means on the other of the outer jaws and manually operable means engaging one of the outer jaws whereby the outer jaw may be vertically moved relative to the inter-engaging jaw to engage and disengage said outer jaws.

6. Pipe tongs comprising a handle, oppositely disposed series of pivotally connected jaws mounted on the handle, a keeper jaw in one of the series, a locking finger on the other of the series, said locking finger engaging means on the keeper jaw, and means engaging a jaw in the series including the locking finger whereby the locking finger is moved vertically relative to the keeper jaw to engage and disengage the keeper jaw.

7. Pipe tongs comprising a handle, a casing-engaging means connected to the handle comprising two oppositely disposed series of pivotally connected jaws, means for detachably connecting the outer swinging jaws of the two series, said last named means comprising engageable means on one of the outer jaws and engaging means on the other of the outer jaws, and manually rotatable cam means engaging a jaw of one series whereby one of said outer jaws may be vertically moved relative to the inter-engaging jaw, thereby engaging and disengaging the detachable connecting means.

8. Pipe tongs comprising a handle, oppositely disposed series of pivotally connected jaws mounted on the handle, a keeper jaw in one of the series, a locking finger on the other of the series, said locking finger engaging means on the keeper jaw, and manually rotatable cam means engaging a jaw in the series including the locking finger whereby the locking finger is moved vertically relative to the keeper jaw to engage and disengage the keeper jaw.

9. Pipe tongs comprising a handle, two oppositely disposed series of pivotally connected jaws, said series being pivotally connected to the handle, a keeper jaw in one series, a locking finger in the other series, means on the locking finger engageable with the keeper jaw whereby the tongs are locked around a pipe, and manually rotatable cam means engageable with one of the jaws in the series including the locking finger whereby the locking finger may be vertically moved relative to the keeper jaw to engage and disengage the keeper jaw.

10. Pipe tongs comprising a handle, two oppositely disposed series of pivotally connected jaws, both of the series being pivotally mounted on the handle, a keeper jaw in one of the series, lugs on the keeper jaw, a locking finger in the other series of jaws, said locking finger being engageable with the lugs, a manually rotatable means engaging a jaw of the series including the locking finger whereby the locking finger is moved vertically relative to the keeper jaw to engage and disengage the lugs.

11. Pipe tongs comprising a handle, two oppositely disposed series of pivotally connected jaws, both of the series being pivotally mounted on the handle, a keeper jaw in one of the series, lugs on the keeper jaw, a locking finger in the other series of jaws, said locking finger being engageable with the lugs, a manually rotatable cam means engaging a jaw of the series including the locking finger whereby the locking finger is moved vertically relative to the keeper jaw to engage and disengage the lugs.

12. Pipe tongs comprising a handle, two oppositely disposed series of pivotally connected jaws, the two series being pivotally attached to the handle, a keeper jaw at the outer end of one of the series, a locking finger at the outer end of the other series, a pin on the locking finger, said keeper jaw having a recess to receive the pin, and manually rotatable cam means engaging the locking finger whereby the locking finger is moved vertically relative to the keeper jaw to engage and disengage the recess in the keeper jaw.

LEONARD E. VAUGHN.